(12) United States Patent
Myers et al.

(10) Patent No.: US 8,604,831 B2
(45) Date of Patent: Dec. 10, 2013

(54) INTEGRATED CIRCUIT, CLOCK GATING CIRCUIT, AND METHOD

(75) Inventors: James Edward Myers, Cambridgeshire (GB); Edmond John Simon Ashfield, Cambridge (GB)

(73) Assignee: Cambridge (GB)

( * ) Notice: Subject to any disclaimer, the term of this patent is extended or adjusted under 35 U.S.C. 154(b) by 48 days.

(21) Appl. No.: 13/200,341

(22) Filed: Sep. 23, 2011

(65) Prior Publication Data
US 2012/0139590 A1 Jun. 7, 2012

(30) Foreign Application Priority Data
Dec. 1, 2010 (GB) .................................. 1020307.3

(51) Int. Cl.
*H03K 19/00* (2006.01)
(52) U.S. Cl.
USPC ............................................ 326/93; 327/113
(58) Field of Classification Search
USPC .............................. 327/113; 716/111; 326/93
See application file for complete search history.

(56) References Cited

U.S. PATENT DOCUMENTS

| | | | |
|---|---|---|---|
| 5,336,939 A | 8/1994 | Eitrheim et al. | |
| 6,072,348 A * | 6/2000 | New et al. ...................... | 327/295 |
| 6,963,986 B1 | 11/2005 | Briggs et al. | |
| 7,613,971 B2 * | 11/2009 | Asaka ............................. | 714/731 |
| 7,812,673 B1 * | 10/2010 | Gilbert et al. .................. | 330/279 |
| 2001/0005871 A1 | 6/2001 | Shimoda et al. | |
| 2003/0234670 A1 * | 12/2003 | Curran ............................ | 327/122 |
| 2004/0170200 A1 | 9/2004 | Radjassamy | |
| 2005/0262376 A1 | 11/2005 | McBain | |

FOREIGN PATENT DOCUMENTS

| | | |
|---|---|---|
| GB | 2 398 194 | 8/2004 |
| JP | 7-106926 | 4/1995 |
| JP | 10-199240 | 7/1998 |
| WO | WO 02/43075 | 5/2002 |

OTHER PUBLICATIONS

Nadia Khouja, Khaled Grati, and Adel Ghazel, "Low Power FPGA-Based Implementation of Decimating Filters for Multistandard Receiver," IEEE 2006.*
Sherif A. Tawfik and Volkan Kursun "Dual Supply Voltages and Dual Clock Frequencies for Lower Clock Power and Suppressed Temperature-Gradient-Induced Clock Skew," IEEE Transactions on VLSI, vol. 18, No. 3, Mar. 2010.*
Teng Siong Kiong and Dr. Norhayati Soin, "Physically aware low power clock gates synthesis algorithm for high speed VLSI design," 2009 International Conference for Technical Postgraduates, Dec. 14-15, 2009.*
Jianchao Lu and Baris Taskin, "Clock Tree Synthesis with XOR gates for polarity assignment," 2010 IEEE Annual Symposium on VLSI, Jul. 2010.*

(Continued)

*Primary Examiner* — Thienvu Tran
(74) *Attorney, Agent, or Firm* — Nixon & Vanderhye P.C.

(57) ABSTRACT

An integrated circuit 2 comprises a functional circuit 4, 6 which is arranged to operate in response to an operational clock signal having an operational clock frequency. To conserve power, the clock signal is distributed across the integrated circuit 2 at a distribution clock frequency which is less than the operational clock frequency. A clock converter 10 is provided to convert the distribution clock signal into the operational clock signal for controlling operation of the functional circuit 4, 6.

27 Claims, 9 Drawing Sheets

(56) References Cited

OTHER PUBLICATIONS

S.A. Tawfik et al, "Dual Supply Voltages and Dual Clock Frequencies for Lower Clock Power and Suppressed Temperature-Gradient-Induced Clock Skew" *IEEE Transactions on Very Large Scale Integration (VLSI) Systems*, vol. 18, No. 3, Mar. 2010, pp. 347-355.

R.L. Aguiar et al, "Clock Distribution Strategy for IP-based Development" Proceedings of International Conference on Very Large Scale Integration, Dec. 1999, pp. 181-191.

UK Search Report dated Mar. 10, 2011 in GB 1020307.3.

UK Search Report dated Jun. 20, 2011 in GB 1020307.3.

\* cited by examiner $T_d = 2T_o \longrightarrow f_d = \dfrac{f_o}{2}$

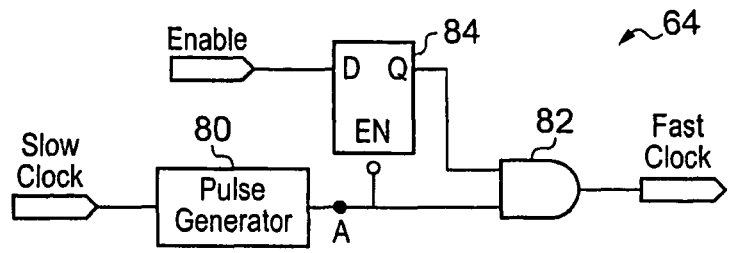
FIG. 6
| operational clock at A | enable D | latch output Q[n+1] | operational (fast) clock [n+1] |
|---|---|---|---|
| 1 | X | Q[n] | Q[n] |
| 0 | 1 | 1 | 0 |
| 0 | 0 | 0 | 0 |
FIG. 7
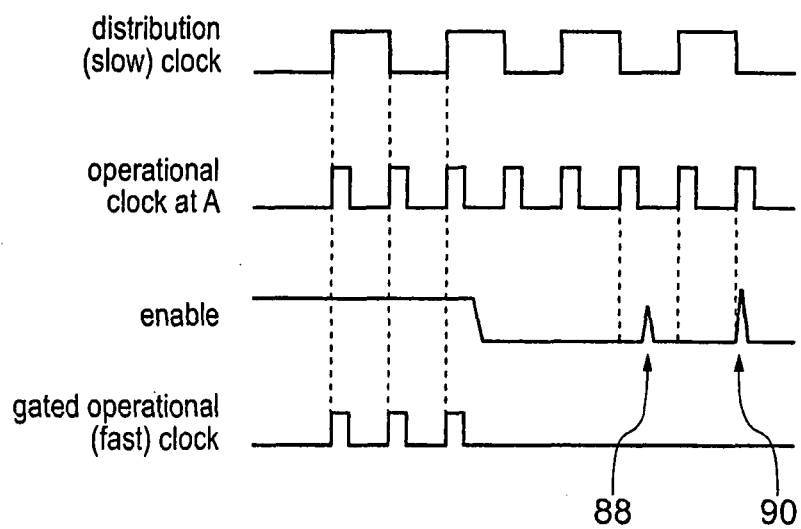
FIG. 8

INTEGRATED CIRCUIT, CLOCK GATING CIRCUIT, AND METHOD

FIELD OF THE INVENTION

The present invention relates to the field of integrated circuits. More particularly, the invention relates to a technique for reducing the amount of power consumed in distributing clock signals across an integrated circuit.

BACKGROUND

An integrated circuit may include at least one functional circuit which operates in response to a clock signal. A clock distribution tree may be provided to distribute the clock signal to the functional circuit. The clock signal drives high capacitance wires in the clock distribution tree, and so the clock distribution tree tends to consume a relatively large amount of power. The higher the clock frequency, the more often the clock signal switches between low and high states and so the greater the amount of power consumed by the clock distribution tree. If a lower frequency clock signal was used, then power could be conserved, although this would limit the functionality and performance level achieved by the functional circuit.

Functional circuits usually operate in response to the rising edge of the clock signal. It has been proposed to modify the configuration of a functional circuit so that it responds to both rising and falling edges of the clock signal. Hence, the existing performance level could be achieved with a clock signal having half the frequency. However, many existing circuit designs are designed to operate in response to only the rising edges, so are not compatible with this technique. In an integrated circuit comprising hundreds of functional circuits, modifying each functional circuit to change the way in which it responds to the clock signal may require considerable design and manufacturing expenditure. The present technique seeks to reduce the power consumed in distributing a clock signal in a way that enables existing functional circuits to be used whilst still maintaining the existing functionality and performance level of the functional circuits.

SUMMARY

Viewed from one aspect, the present invention provides an integrated circuit comprising:

a functional circuit configured to operate in response to an operational clock signal having an operational clock frequency;

clock distribution circuitry configured to distribute a distribution clock signal across said integrated circuit at a distribution clock frequency, said distribution clock frequency being less than said operational clock frequency; and a clock converter configured to convert said distribution clock signal distributed by said clock distribution circuitry into said operational clock signal for controlling operation of said functional circuit.

An integrated circuit comprises clock distribution circuitry and a functional circuit. The functional circuit is designed to operate in response to a clock signal having a given operational clock frequency. However, the present technique recognises that, counter-intuitively, the clock signal can be distributed across the integrated circuit at a different frequency to the operational clock frequency. The clock distribution circuitry is arranged to distribute a distribution clock signal across the integrated circuit at a distribution clock frequency lower than the operational clock frequency. A clock converter is provided to convert the distribution clock signal into the operational clock signal for controlling operation of the functional circuit. By distributing a lower frequency clock signal, less power is consumed by the clock distribution circuitry than would be the case if the operational clock signal is distributed. However, the functionality and performance level of the functional circuit is maintained, and the power saving is achieved without requiring the functional circuit to be redesigned, because the operational clock signal provided to the functional circuit has the same frequency as the clock signal with which the functional circuit is designed to operate.

Typically, the greatest saving in power consumption can be achieved if the clock converter is located close to the functional circuit on the integrated circuit, since this would reduce the extent to which the operational clock signal is distributed across the circuit. Nevertheless, some embodiments may optionally include further clock distribution circuitry for distributing the operational clock signal from the clock converter to the functional circuit.

The functional circuit may be any kind of circuit which provides a function under control of a clock signal. For example, the functional circuit may be a processor, graphics processor, co-processor, cache, memory, cache or memory controller, register bank, etc.

In one example, the clock distribution circuitry may comprise a clock input for receiving the distribution clock signal from an external clock generator. Alternatively, the clock distribution circuitry may comprise a clock generator for generating the distribution clock signal. Hence, the distribution clock signal may be generated either on-chip or off-chip as desired.

As the clock distribution circuitry distributes a distribution clock signal having a distribution clock frequency less than the operational clock frequency, then the power consumption of the clock distribution circuitry is smaller than if the operational clock signal was distributed. The distribution clock frequency may be any frequency which is lower than the operational clock frequency. For example, the operational clock frequency may be an integer number of times (two or more) the distribution clock frequency.

However, it can be useful to arrange for the distribution clock frequency to be half the operational clock frequency. If the distribution clock frequency is half the operational clock frequency, then the clock converter configuration can be simplified because the clock converter can trigger each cycle of the operational clock signal in response to the rising and falling edges of the distribution clock signal. The lower the complexity of the clock converter, the smaller the amount of power consumed by the clock converter and hence the greater the power saving achievable by the present technique.

The distribution clock frequency need not be exactly half of the operational clock frequency—a frequency about half that of the operational clock frequency is sufficient. In this application, references to "half" the frequency should be interpreted as "substantially half" the frequency.

The clock converter may comprise a pulse generator configured to generate a clock pulse in response to each clock transition of the distribution clock signal, so that the operational clock signal may comprise a series of clock pulses generated by the pulse generator. When the distribution clock signal transitions between high and low states, the pulse generator may generate a pulse including at least one rising edge and at least one falling edge, so as to generate an operational clock signal having a greater clock frequency than distribution clock signal.

The clock converter may be located on any part of the integrated circuit along which the clock signal is distributed to the functional circuit. For example, the clock converter may be within the clock distribution circuitry itself, or may be positioned between the clock distribution circuitry and the functional circuit.

In order to achieve a further reduction in the power consumed by clock distribution, the signal voltage of the distribution clock signal may be lower than the signal voltage of the operational clock signal. That is, the distribution clock signal may be distributed at a distribution voltage level, and the operational clock signal may be provided at an operational voltage level, the distribution voltage level being lower than the operational voltage level. The clock converter may include a voltage converter for converting the voltage level from the distribution voltage level to the operational voltage level when generating the operational clock signal from the distribution clock signal. Hence, frequency conversion and voltage conversion may be used in tandem if desired.

The present technique can also be used together with other power saving techniques, such as dynamic voltage/frequency scaling (in which the operating voltage or frequency of the entire integrated circuit is reduced to save power), or the technique described above wherein the functional circuit is modified to respond to both edges of the clock signal.

Also, the present technique may be used in an integrated circuit comprising clock gates for controlling whether a signal transition in a clock signal is propagated to a functional circuit. Clock gates can be used to save power when particular functional circuits are not being used. The clock gate selectively allows or prevents clock transitions from being propagated to the functional circuit. When the clock gate prevents propagation of the clock transitions to the functional circuit, then power can be conserved, since capacitive elements of the functional circuit will no longer be driven by a clock signal that switches states.

When the present technique is used in tandem with clock gates, the clock converter may be provided separately from the clock gating circuit. Hence, the integrated circuit may include both a clock converter for converting the distribution clock signal into the operational clock signal, and a clock gating circuit for controlling whether the signal transitions in the clock signal are propagated through to the functional circuit.

However, it may be more efficient to provide the clock converter as part of the clock gating circuit itself. In a circuit which uses clock gates, the clock gates will usually be provided on the clock distribution paths to each functional circuit within the integrated circuit, and so the locations of the clock gates will typically correspond to points of the clock path at which conversion from the distribution clock signal to the operational clock signal would be desired. Hence, the clock conversion and clock gating functionalities can be efficiently provided as part of a single circuit. By including the clock conversion functionality within the clock gating circuit, little modification of the rest of the clock distribution circuitry is required.

In one example, the clock gating circuit may be configured to receive the distribution clock signal from the clock distribution circuitry, to convert the distribution clock signal into the operational clock signal using the clock converter, and to output to the functional circuit a gated operational clock signal generated in response to the operational clock signal and an enable signal. The clock gating circuit may control, in dependence on the enable signal, whether a clock transition of the operational clock signal triggers a clock transition of the gated operational clock signal. The enable signal will often be generated by a part of the integrated circuit that is clocked at the operational clock frequency, or be input to the integrated circuit with a value that may change at a rate equivalent to the operational clock frequency, and so it can be useful to convert the distribution clock signal into the operational clock signal before gating the operational clock signal based on the enable signal.

In one example, if the enable signal has a first state then the clock gating circuit may allow a clock transition of the gated operational clock signal to be propagated to the functional circuit in response to a clock transition of the operational clock signal, while if the enable signal has a second state then clock transitions would not be propagated to the functional circuit and instead a gated operational clock signal having a constant signal level would be output to the functional circuit. When clock transitions of the gated operational clock signal are disabled by the clock gating circuit, power is conserved in the functional circuit.

In one example, the clock gating circuit may comprise a logic gate configured to generate the gated clock signal by applying a logical operation to the operational clock signal and the enable signal. For example, the logic gate could be an AND gate for combining the operational clock signal and enable signal in an AND operation. Alternatively a NAND gate could be used. Any type of logic gate for allowing signal transitions of the operational clock signal to be selectively propagated or blocked in dependence on the enable signal can be used.

The clock gating circuit may comprise a transparent latch configured to selectively supply the enable signal to the logic gate in dependence on a current state of the operational clock signal. A glitch in the enable signal could occasionally cause the gated operational clock signal to transition between states incorrectly. By providing a transparent latch which, based on the current state of the operational clock signal, selects whether to supply the enable signal to the logic gate or prevent the enable signal being supplied to the logic gate, it is less likely that such glitches in the enable signal will be transmitted to the logic gate, and so the gated operational clock signal output from the logic gate is less susceptible to errors.

Clock gating circuits may be located at different locations within the integrated circuit. In one example, functional circuits may be provided with corresponding clock gates for powering up and down individual functional circuits at a finely grained level.

Clock gates may also be provided at a higher level of the clock distribution tree, for controlling the clock signal supplied to a group of associated circuits.

For example, the clock distribution circuitry may comprise:

an upstream distribution portion for distributing said distribution clock signal across said integrated circuit at said distribution clock frequency;

an intermediate clock gating circuit for receiving said distribution clock signal from said upstream distribution portion; and a downstream distribution portion for distributing said distribution clock signal from said intermediate clock gating circuit to at least said clock converter at said distribution clock frequency;

wherein said intermediate clock gating circuit is configured to control whether or not a clock transition of said distribution clock signal is propagated to said downstream distribution portion.

Hence, the intermediate clock gating circuit is located at an intermediate point within the clock distribution circuitry and so can be used to control whether clock transitions are propagated to circuitry located downstream of the intermediate clock gating circuit. The intermediate clock gating circuit allows parts of the integrated circuit to be placed in a power saving state with a coarser granularity than the individual clock gates associated with particular functional circuits. If it is known that none of the circuitry located downstream of the intermediate clock gating circuit is necessary for a particular operation, then the intermediate clock gating circuit can be used to power down the downstream circuitry in an efficient manner.

The intermediate gating circuit is located at an intermediate point of the clock distribution circuitry. Therefore, the intermediate clock gating circuit receives the distribution clock signal from the upstream distribution portion and distributes the distribution clock signal to the downstream distribution portion. Hence, one would expect that there is no need for clock conversion within the intermediate clock gating circuit. However, the enable signal, which controls whether or not the intermediate clock gating circuit allows clock transitions to be propagated to the downstream distribution portion, typically has a value which may vary at a rate equivalent to the operational clock frequency. For instance, the enable signal may be received from another part of the integrated circuit, such as a register, which is clocked at the operational clock frequency. As the enable signal may switch state at the rate of the operational clock frequency, then the gating function of the intermediate clock gating circuit should also be able to respond at the operational clock frequency. Therefore, it can be useful for the intermediate clock gating circuit to comprise an intermediate clock converter for converting the distribution clock signal received from the upstream distribution portion into an intermediate operational clock signal having the operational clock frequency. The intermediate operational clock signal can then be gated based on the enable signal, converted back to the distribution clock frequency, and output to the downstream distribution portion at the distribution clock frequency.

In some embodiments, the intermediate clock gating circuit may have separate circuits for gating the intermediate operational clock signal based on the enable signal and for converting the gated intermediate operational clock signal back into a gated distribution clock signal at the distribution clock frequency.

However, it may be more efficient to provide a common circuit which performs both the gating of the clock signal and the frequency conversion from the operational clock frequency to the distribution clock frequency. For instance, a toggle flip-flop may be used. The toggle flip-flop may generate the gated distribution clock signal based on the intermediate operational clock signal generated by the intermediate clock converter. The toggle flip-flop may be arranged such that when the enable signal has a first state then the toggle flip-flop toggles the value of the gated distribution clock signal in response to each clock cycle of the intermediate operational clock signal, and when the enable has a second state then the toggle flip-flop holds the gated distribution clock signal at its current value. This form of toggle flip-flop implements the gating and frequency conversion functions of the intermediate clock gating circuit in an efficient way.

Although the present technique may be applied to an integrated circuit comprising a single functional circuit, the integrated circuit may comprise a plurality of functional circuits configured to operate in response to the operational clock signal having the operational clock frequency. At least one clock converter may be provided to convert the distribution clock signal distributed by the clock distribution circuit into an operational clock signal for controlling operation of at least one associated functional circuit.

In some embodiments, each functional circuit may be provided with its own associated clock converter. Alternatively, at least one clock converter may be shared between functional circuits so that the operational clock signal provided by the clock converter is transmitted to two or more associated functional circuits.

It is not essential for every functional circuit of the integrated circuit to operate in response to an operational clock signal converted from a lower frequency distribution clock signal as described above. There may be some kinds of functional circuit that are unable to operate in response to an operational clock signal which is converted from a distribution clock signal, such as negative edge triggered memories or latches. Therefore, in some embodiments the integrated circuit may comprise at least one further functional circuit which operates in response to a further operational clock signal distributed by further clock distribution circuitry. The further operational clock signal has a further operational clock frequency which may be the same as, or different to, the operational clock frequency. Hence, for a further functional circuit that cannot operate using the present technique, a separate clock distribution network may be provided for distributing a further operational clock signal at the frequency with which the further functional circuit is designed to operate. Even if one or more functional circuits do not use the clock conversion technique, the overall power consumption of the integrated circuit can still be reduced by using the clock conversion technique for at least one other functional circuit.

The clock converter may comprise an inverter for inverting the operational clock signal for supply to the functional circuit. Since inversion of the clock signal causes rising edges to become falling edges and vice versa, the inversion enables the relative timings of rising edges and falling edges within the operational clock signal to be adjusted. Hence, a functional circuit whose operation is triggered off either the rising edge or the falling edge of the operational clock signal can have its timings adjusted. This can be useful, for example, for static compensation for process variations within the functional circuits. By tuning the relative timings of clock edges of the operational clock signal using the inverter, yield, reliability and performance of the integrated circuit can be improved.

The operational clock signal need not always be inverted by the inverter. The clock converter may comprise selective inversion capability so that the inverter selectively inverts the operational clock signal in dependence on an inversion control signal. By selectively inverting or not inverting the operational clock signal, the relative timings of the edges of the operational clock signal can be adjusted, for example for dynamic compensation of effects such as temperature and voltage.

The inversion technique is particularly useful when the integrated circuit includes two different clock converters. The two clock converters may provide respective operational clock signals to two distinct functional circuits, or to two different parts of the same functional circuit. If neither clock signal is inverted, or both are inverted, then there will be a given time period between a rising edge of one clock signal and a rising edge of the other clock signal in the following clock cycle. By inverting one of the clock signals relative to the other, then this period between rising edges can be conveniently adjusted.

This can be useful, for example, when a functional circuit, which is clocked by the clock signal generated by a first clock converter, captures a data value which is generated in a previous clock cycle by another functional circuit (or a different part of the same functional circuit) which is clocked by the clock signal generated by a second clock converter. By inverting the clock signal of the first clock converter, but continuing to supply a non-inverted clock signal from the second clock converter, the time period between the start of generation, of the data value and the capture of the data value can be increased, so as to reduce the likelihood of the data value being captured too early. Hence, the probability of an error occurring may be reduced.

Viewed from another aspect, the present invention provides an integrated circuit comprising:

functional circuit means for operating in response to an operational clock signal having an operational clock frequency;

clock distribution means for distributing a distribution clock signal across said integrated circuit at a distribution clock frequency, said distribution clock frequency being less than said operational clock frequency; and clock converting means for converting said distribution clock signal distributed by said clock distribution means into said operational clock signal for controlling operation of said functional circuit means.

Viewed from a further aspect, the present invention provides a method of operating an integrated circuit comprising a functional circuit for operating in response to an operational clock signal having an operational clock frequency, said method comprising:

distributing a distribution clock signal across said integrated circuit, said distribution clock signal having a distribution clock frequency, said distribution clock frequency being less than said operational clock frequency;

converting said distribution clock signal into said operational clock signal having said operational clock frequency; and operating said functional circuit in response to said operational clock signal having said operational clock frequency.

Viewed from another aspect, the present invention provides clock gating circuit for controlling the supply of an output clock signal to associated circuitry, said clock gating circuit comprising:

a clock input configured to receive a distribution clock signal having a distribution clock frequency;

a clock converter configured to convert said distribution clock signal into an operational clock signal having an operational clock frequency, said operational clock frequency being higher than said distribution clock frequency;

gating circuitry configured to generate said output clock signal based on an enable signal and said operational clock signal generated by said clock converter; and a clock output configured to output said output clock signal to said associated circuitry; wherein said gating circuitry is configured to control, in dependence on said enable signal, whether a clock transition of said operational clock signal triggers a clock transition in said output clock signal.

As described above, the clock conversion capability may be provided within a clock gating circuit. The clock gating circuit may be used in different parts of an integrated circuit.

For example, the clock gating circuit may be a clock gate for use at the lower end of the clock distribution tree (that is, the part of the clock distribution tree that is closer to the functional circuit being supplied with a clock signal). Hence, the clock gating circuitry may output the output clock signal at the operational clock frequency for controlling operation of at least one associated functional circuit. The clock gating circuit may comprise the logic gate and the transparent latch described above.

Alternatively, the clock gating circuit may be intended for use higher up in the clock distribution tree (e.g. at an intermediate point of the clock distribution tree). In this case it may be desired for the clock gating circuit to output the output clock signal at the distribution clock frequency for further distribution across the integrated circuit. In this example, the clock gating circuit may comprise a toggle flip-flop as described above.

Viewed from another aspect, the present invention provides a clock gating circuit for controlling the supply of an output clock signal to associated circuitry, said clock gating circuit comprising:

clock input means for receiving a distribution clock signal having a distribution clock frequency;

clock converting means for converting said distribution clock signal into an operational clock signal having an operational clock frequency, said operational clock frequency being higher than said distribution clock frequency;

gating means for generating said output clock signal based on said operational clock signal generated by said clock converting means and an enable signal; and clock output means for outputting said output clock signal to said associated circuitry; wherein said gating means is configured to control, in dependence on said enable signal, whether a clock transition of said operational clock signal triggers a clock transition in said output clock signal.

Viewed from another aspect, the present invention provides a computer-readable storage medium storing a data structure comprising a standard cell circuit definition for controlling a computer to generate and validate a circuit layout of a circuit cell of an integrated circuit, said circuit cell comprising the clock gating circuit as described above.

The standard cell circuit definition may specify characteristics of the clock gating circuit, including at least one of timing characteristics, logical functions, physical interface characteristics and electrical interface characteristics of the clock gating circuit. The data structure may be a single data structure or a distributed data structure. The storage medium (which may encompass multiple storage media in the case of a distributed data structure) may be non-transitory.

The data structure may, for example, be part of a standard cell library used to generate and validate a circuit layout of an integrated circuit comprising the clock gating circuit. The standard cell library defines characteristics of a range of different kinds of standard cells. For example, the standard cells included in the library may include standard cell representations of different kinds of logic gates (e.g. NAND, AND, OR etc.), circuits for performing arithmetic functions (e.g. adders, multipliers), latches, flip-flops, power control circuits, and so on. Each standard cell represents a "building block". An integrated circuit layout can be generated as a combination of the building blocks defined in the library. By encapsulating a collection of low level logic (such as transistors) into a higher level abstraction of a standard cell, then the integrated circuit can be built up from the standard cells without the designer needing to be aware of the actual logic present within each standard cell. When developing the integrated circuit, a circuit designer may specify a desired combination and arrangement of standard cells of the library. Alternatively, the designer may specify constraints which should be satisfied by the integrated circuit, and a synthesis tool can generate an integrated circuit layout comprising a given arrangement of standard cells that satisfies those constraints. The integrated circuit layout developed using the standard cell library may be used to control the manufacture of the integrated circuit.

Standard cell libraries may include a standard cell definition of a clock gating circuit. According to the present technique, the standard cell definition of the clock gate standard cell may be modified to include a clock frequency conversion function, so that the clock conversion technique can be implemented on the integrated circuit with little redesign of the rest of the integrated circuit.

Viewed from yet another aspect, the present invention provides a method for controlling the supply of an output clock signal to associated circuitry, said method comprising steps of:

receiving a distribution clock signal having a distribution clock frequency;

converting said distribution clock signal into an operational clock signal having an operational clock frequency, said operational clock frequency being higher than said distribution clock frequency;

generating said output clock signal based on said operational clock signal and an enable signal; and outputting said output clock signal to said associated circuitry; wherein said generating step includes controlling, in dependence on said enable signal, whether a clock transition of said operational clock signal triggers a clock transition in said output clock signal.

The above, and other objects, features and advantages of this invention will be apparent from the following detailed description of illustrative embodiments which is to be read in connection with the accompanying drawings.

BRIEF DESCRIPTION OF THE DRAWINGS

FIG. 6 shows an example of a clock gating circuit comprising a clock converter;

FIG. 7 illustrates the relationship between the input and output signals of the clock gate of FIG. 6;

FIG. 8 illustrates an example of signal timings for the clock gate of FIG. 6;

DESCRIPTION OF NON-LIMITING EXAMPLE EMBODIMENTS

Figure 1:
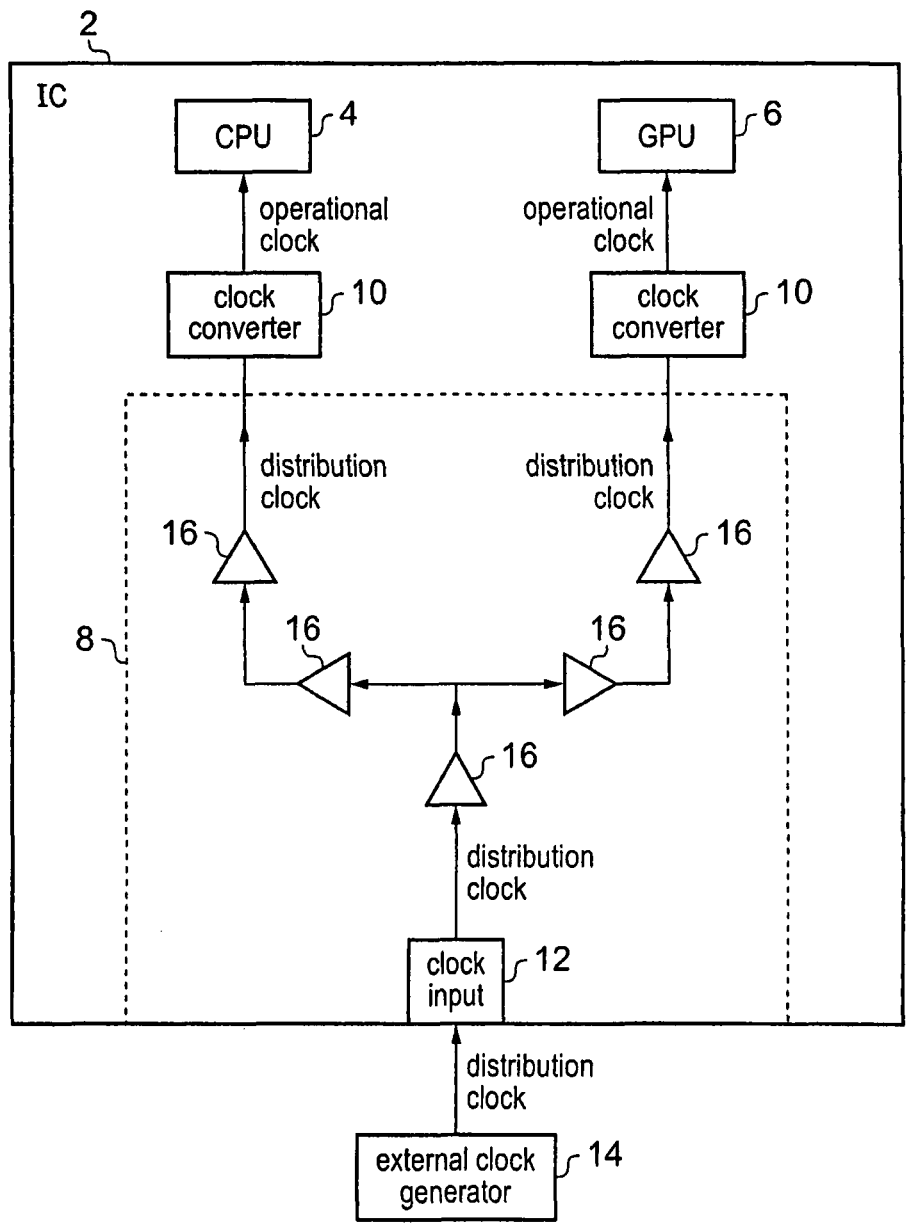
FIG. 1 schematically illustrates an integrated circuit comprising a clock converter for converting a distribution clock signal distributed by clock distribution circuitry into an operational clock signal for controlling operation of a functional circuit.

FIG. 1 illustrates an integrated circuit 2 comprising functional circuits 4, 6. In this example, the functional circuits include a processing unit (CPU) 4 and a graphics processing unit (GPU) 6. The functional circuits 4, 6 operate in response to an operational clock signal having an operational clock frequency. It will be appreciated that the functional circuits may comprise other kinds of functional circuits instead of, or as well as, the CPU or GPU.

The integrated circuit 2 comprises clock distribution circuitry 8 for distributing a clock signal to the functional circuits 4, 6. The distribution circuitry 8 does not distribute a clock signal at the same frequency as the operational frequency with which the functional circuits 4, 6 are designed to operate. Instead, the distribution circuitry 8 distributes a distribution clock signal having a distribution clock frequency which is less than the operational clock frequency. Clock converters 10 are provided to convert the distribution clock signal distributed by the distribution circuitry 8 into the operational clock signal for controlling operation of the functional circuit 4, 6 at the operational clock frequency.

The clock distribution circuitry 8 distributes the distribution clock signal from a common clock source to clock converters 10 associated with the various functional circuits that require a clock signal. In this example, the clock source is a clock input 12 which receives the distribution clock signal from an external clock generator 14. The clock source may in other embodiments comprise an on-chip clock generator.

The clock distribution circuitry 8 may comprise a clock distribution tree which fans out from the clock source at the higher end of the tree, with branches of the distribution circuitry 8 extending to the functional circuits 4, 6 located at the lower end of the tree. While FIG. 1 shows the clock distribution tree 8 comprising two branches for supplying a clock signal to the respective functional circuits 4, 6, an integrated circuit comprising a greater number of functional circuits would typically comprise a clock distribution tree 8 having a greater number of branches and sub-branches for distributing the clock signal to associated functional circuits. The clock distribution tree 8 comprises a network of wires and buffers 16 for distributing the clock signal across the integrated circuit 2. The buffers 16 are used to repeat the clock signal so as to maintain the signal level of the clock signal as it is passed across the integrated circuit 2.

In this example, the clock converter 10 receives the distribution clock signal from the clock distribution circuitry 8 and supplies the operational clock signal to an associated functional circuit 4, 6. In other examples, the clock converter 10 may be provided within the clock distribution circuitry 8 so that some further distribution circuitry is provided between the clock converter 10 and the associated functional circuit. Also, it is not essential for each functional circuit 4, 6 to be provided with its own individual clock converter 10. In other examples, two or more functional circuits may share the same clock converter 10.

Figure 2:
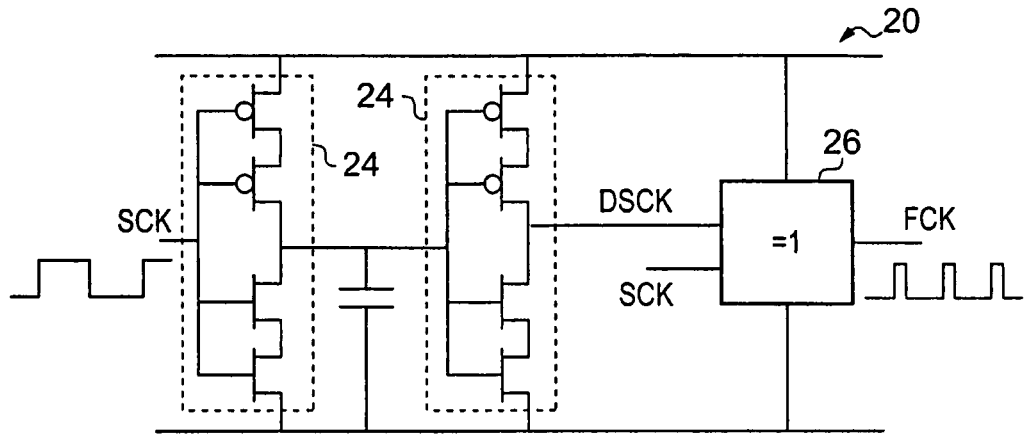
FIG. 2 schematically illustrates an example of a pulse generator for converting a distribution clock signal into an operational clock signal.

The clock converter 10 may comprise a pulse generator for generating a pulse in response to each signal transition of the distribution clock signal. A series of such pulses may form the operational clock signal for controlling operation of one or more associated functional circuits 4, 6. A wide variety of different kinds of pulse generators may be used. FIG. 2 shows a particular example of a pulse generator 20, but other kinds of pulse generator may also be used for the clock converter 10.

Figure 3:
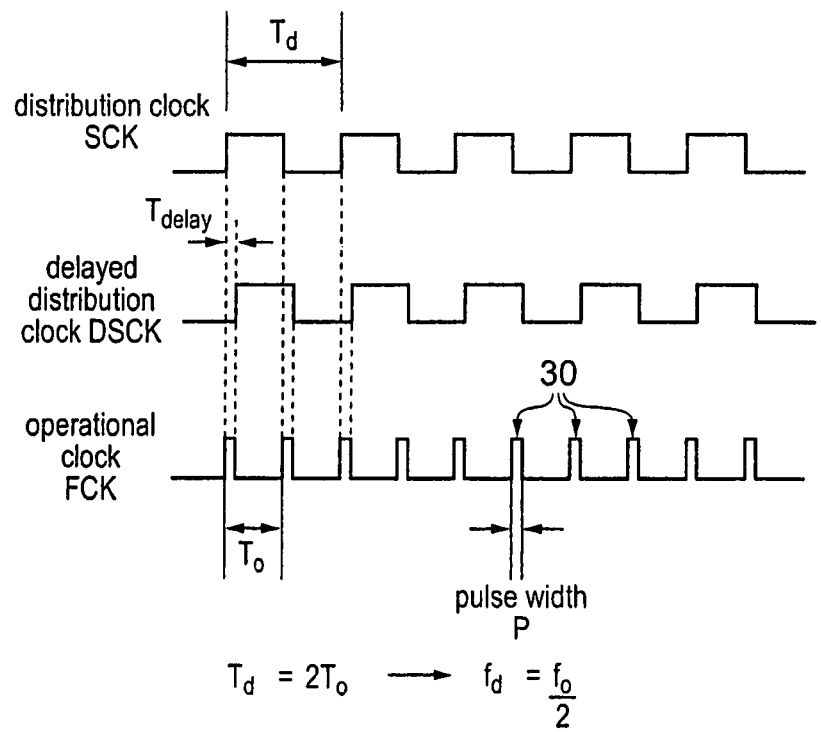
FIG. 3 illustrates an example of signal timings for the pulse generator of FIG. 2.

The pulse generator 20 shown in FIG. 2 receives the distribution clock signal SCK distributed by the clock distribution circuitry 8. The pulse generator 20 comprises a delaying element which produces a delayed version DSCK of the distribution clock signal SCK. In the example of FIG. 2, the delaying element comprises a series of inverting stages 24 which successively invert the distribution clock signal SCK and invert the inverted signal back again. As shown in FIG. 3, the output DSCK of the inverting stages 24 is equivalent to the distribution clock signal SCK delayed by a given time period $T_{delay}$. The pulse generator 20 comprises a logic gate 26 which generates the operation clock signal FCK based on the distribution clock signal SCK and the delayed distribution clock signal DSCK. In example of FIG. 2, the logic gate 26 is an XOR gate which combines the input signal in an exclusive OR operation. Hence, the operational clock signal FCK is high during the periods when the distribution clock SCK and the delayed distribution clock DSCK differ from one another and is low during the remainder of the clock period. The result is an operational clock signal FCK comprising pulses 30 corresponding to each signal transition of the distribution clock signal SCK. Hence, the clock period $T_d$ of the distribution clock signal SCK is substantially double the clock period $T_o$ of the operational clock signal FCK, and the distribution clock frequency $f_d$ is substantially half the operational clock frequency $f_o$.

FIG. 3 shows that the duty ratio of the operational clock signal FCK may not be 50%. In this example, the operational clock signal FCK has a high signal level for a shorter time than the low signal level. For example, the duty ratio may be as little as 20%. The pulse width p of the signal pulse 30 corresponds to the delay $T_{delay}$ provided by the inverting stages 24 of the pulse generator 20. By varying the number of inverting stages 24, the delay $T_{delay}$ (and hence the pulse width p) can be shortened or lengthened as desired, so as to ensure that the pulse width p is sufficiently long to enable the associated functional circuit 4, 6 to perform its associated functional operation. For example, if a particular functional circuit requires a minimum pulse width of 70 picoseconds, then the pulse generator 20 can be arranged to provide a delay $T_{delay}$ of at least 70 picoseconds.

The pulse generator 20 may be used within the clock convertor 10 as shown in FIG. 1. A typical integrated circuit 2 may be expected to include many functional circuits. If the clock signal for those functional circuits is distributed at the operational clock frequency as in the previously known techniques, then the integrated circuit 2 would consume a given amount of power. When applying the present technique, the overall amount of power consumed by the integrated circuit 2 will be reduced if the power saving achieved by distributing the clock signal across the integrated circuit at a lower clock frequency is greater than the power consumed by the clock converters 10. For example, a typical integrated circuit 2 may have clock distribution circuitry that consumes 50 mW of power in distributing the clock signal at the operational clock frequency. By arranging for the clock distribution circuitry 8 to distribute a clock signal having a distribution clock frequency that is half the operational clock frequency, the power consumption of the distribution circuitry 8 can be approximately halved, so that the power saving would be expected to be 25 mW. If the circuit is assumed to require 2500 clock converters, then an overall reduction in power consumption will be achieved provided each clock converter 10 consumes no more than 10 µW of power. In modelling the power consumed by the pulse generator 20 shown in FIG. 2, it was found that the dynamic power consumption of the pulse generator 20 was 5.2 µW on a 32 nm CMOS process. This represents an estimated power saving of 4.8 µW per clock converter 10, which results in a power saving of 12 mW over the entire integrated circuit 2 (24 percent of the power consumed if the clock signal was distributed at the operational clock frequency). Hence, the present technique can be used to reduce the overall power consumption of the integrated circuit 2. It is expected that the power consumption may be reduced even further by producing a more efficient pulse generator.

The pulse generator 20 shown in FIG. 2 converts the distribution clock signal SCK into a faster operational clock signal FCK having double the frequency of the distribution clock signal SCK. That is, the distribution clock signal SCK can be distributed at around half the operational clock frequency required for the functional circuit 4, 6 being clocked by the operational clock signal FCK. However, it is not essential for the distribution clock frequency to be half the operational clock frequency.

For example, a pulse generator 20 could be designed to generate a double clock pulse, comprising two rising edges and two falling edges, in response to each clock transition of the distribution clock signal SCK. This would result in an operational clock signal FCK having around four times the frequency of the distribution clock signal SCK, i.e. the distribution clock signal can be distributed at a distribution clock frequency that is a quarter of the operational frequency required for operating the functional circuit 4, 6. Other forms of pulse generator 20 could be used to implement a frequency conversion with a different ratio between the distribution clock frequency and the operational clock frequency.

Figure 4:
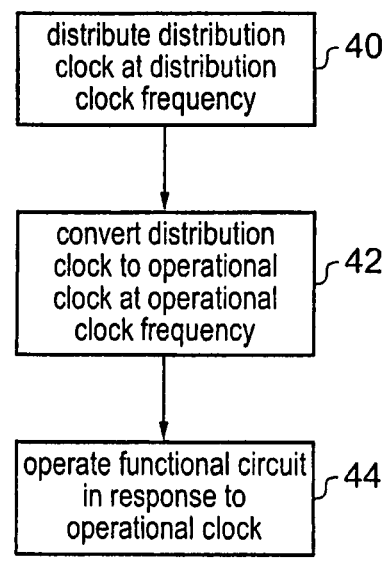
FIG. 4 illustrates a method of operating an integrated circuit.

FIG. 4 illustrates a method of operating an integrated circuit 2. At step 40, a distribution clock signal is distributed across the integrated circuit 2 at the distribution clock frequency. At step 42, the distribution clock signal is converted into an operational clock signal having the operational clock frequency. The operational clock frequency is higher than the distribution clock frequency. Next, at step 44, the functional circuit is operated in response to the operational clock signal generated at step 42.

Figure 5:
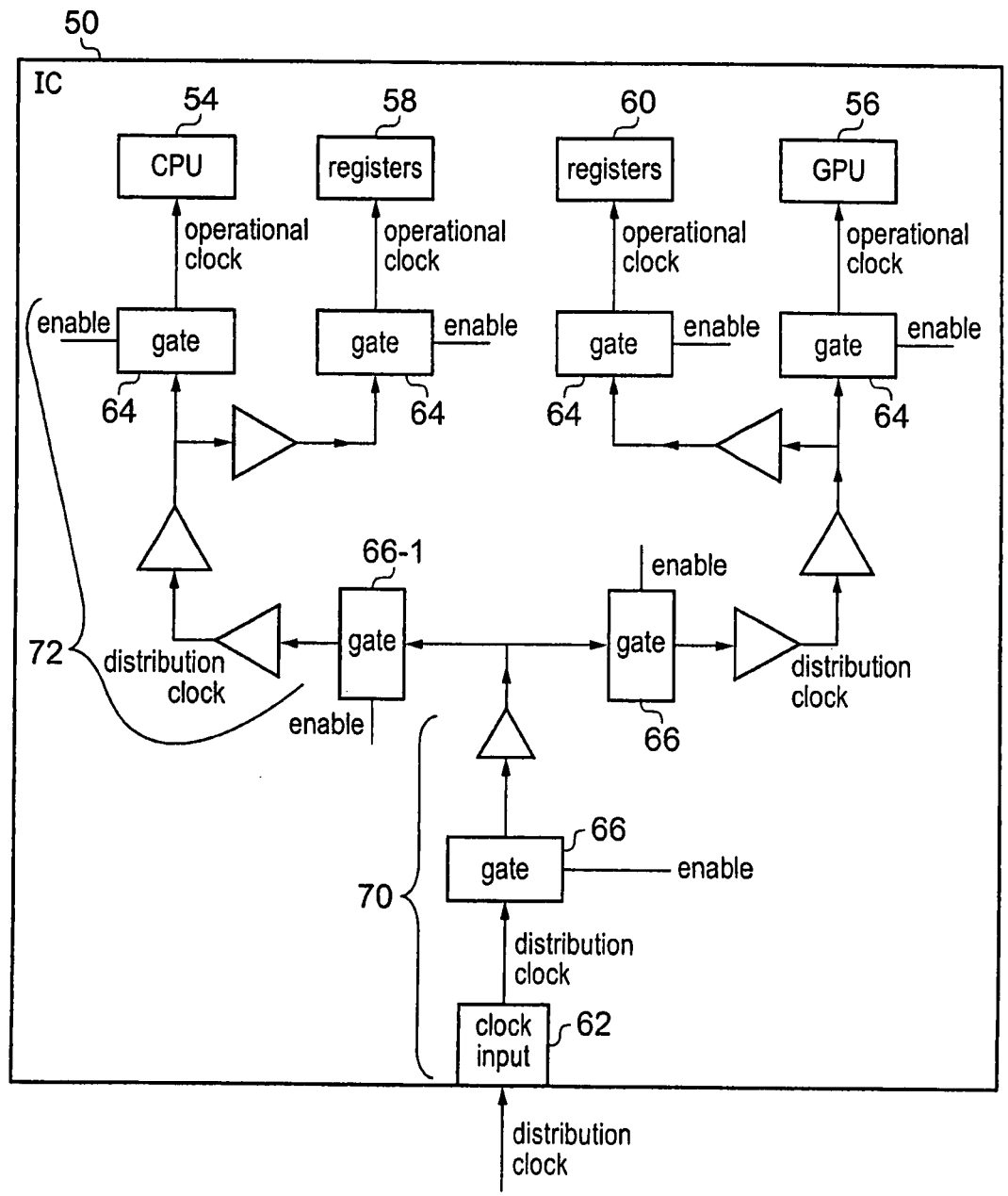
FIG. 5 illustrates an integrated circuit comprising clock gates for controlling whether signal transitions in a clock signal are propagated to a functional circuit.

FIG. 5 illustrates another example of an integrated circuit 50. The integrated circuit 50 comprises clock distribution circuitry and functional circuits 54, 56, 58, 60 similar to those of FIG. 1. In example FIG. 5, the functional circuits include banks of registers 58, 60 as well as a processing unit 54 and graphics processing unit 56. It will be appreciated that other types of functional circuits may also be used. The integrated circuit 50 also comprises clock gates 64, 66 which control whether or not clock signal transitions are propagated to the circuitry located downstream of the clock gate 64, 66.

FIG. 5 shows different kinds of clock gate. Clock gates 64 are provided for controlling, at a fine grained level, whether clock signal transitions are propagated to associated functional circuits. For example, each of the functional circuits 54, 56, 58, 60 is provided with an associated clock gate 64. Each clock gate 64 is responsive to an enable signal to provide individual clock control to the respective functional circuits. When the enable signal is in a first state, then the clock gate 64 allows operational clock signal transitions to be propagated to the associated functional circuit 54, 56, 58, 60 so that the associated functional circuit can perform its functional operation. When the enable signal has a second state, then the clock gate 64 blocks signal transitions from propagating to functional circuit, thus conserving power in the functional circuit. Hence, when the operation of a functional circuit is not required for a period of time, then the associated clock gate 64 can be used to prevent that functional circuit from being clocked, so as to save power. It is not essential for each functional circuit to have its own clock gate 64. In some embodiments two or more functional circuits may share a clock gate 64.

The integrated circuit 50 of FIG. 5 also includes intermediate clock gates 66 which are located further up the clock tree. The intermediate clock gate 66 can be used for controlling clock gating at a less finely grained level than the clock gates 64. Each intermediate clock gate 66 controls whether distribution clock signal transitions are able to propagate to the downstream circuitry that is located beyond the clock gate 66. For example, in FIG. 5 the intermediate clock gate 66-1 is located between an upstream distribution portion 70 of the clock distribution circuitry and a downstream portion 72 of the clock distribution circuitry. The intermediate clock gate 66-1 receives a distribution clock signal from the upstream distribution portion 70, and controls whether or not clock transitions of the distribution clock signal are propagated to the downstream distribution portion 72. Hence, the intermediate clock gate 66-1 controls whether or not the circuitry downstream of the clock gate 66-1 is clocked. In this example, the circuitry downstream of the intermediate clock gate 66-1 includes the processing unit 54 and the register bank 58. If neither the processing unit 54 nor the register bank 58 is necessary for a given processing operation, then the intermediate clock gate 66-1 can be used to prevent the processing unit 54 and register bank 58 being clocked, so as to reduce the power consumed by the integrated circuit 50. Similarly, the other intermediate clock gates 66 shown in FIG. 5 are located between a corresponding upstream distribution portion and a corresponding downstream distribution portion of the distribution network, and control whether clock transitions of the distribution clock signal are propagated to an associated region of the integrated circuit 50.

When the clock conversion technique described above is applied to an integrated circuit 50 having clock gates, the clock converter 10 shown in FIG. 1 may be provided separately from the clock gates 64, 66. However, it may be more efficient to include the clock conversion function of the clock converter 10 within one or more of the clock gates 64, 66. For example, in FIG. 5 the clock gates 64 (but not the clock gates 66) include clock converters for converting the distribution clock signal distributed by the clock distribution circuitry into the operational clock signal used to clock the associated functional circuits 54, 56, 58, 60.

FIG. 6 shows an example of the clock gate 64 shown in FIG. 5. The clock gate 64 would generally be used at the lower end of the clock distribution tree, where the distribution clock signal is converted into an operational clock signal for supplying to at least one associated functional circuit. However, the clock gate 64 could also be used further up the clock distribution tree, so that the distribution clock signal is converted into the operational clock signal at an intermediate point of the clock distribution tree and then distributed further across the integrated circuit 80 at the operational frequency to the functional circuit. The clock gate 64 receives the distribution clock signal (Slow Clock) from the clock distribution circuitry, converts the distribution clock signal into an operational clock signal having a higher clock frequency, gates the operational clock signal in dependence on an enable signal (Enable), and outputs the gated operational clock signal (Fast Clock) for use by one or more associated functional circuits.

In this example, the clock gate 64 comprises a pulse generator 80, a logic gate 82 and a transparent latch 84. The pulse generator 80 may be configured as shown in FIG. 2 for example, or may be a different kind of pulse generator. The pulse generator 80 receives the distribution clock signal from the clock distribution circuitry at the distribution clock frequency, and converts the clock signal into an operational clock signal A. The operational clock signal A is supplied to one of the inputs of the logic gate 82.

An inverted version of the operational clock signal A produced by the pulse generator 80 is also supplied to an enable input EN of the transparent latch 84. The transparent latch 84 receives the enable signal (Enable) at its data input D, and selectively supplies the enable signal to the logic gate 82 depending upon the current state of the operational clock signal A received from the pulse generator 80. As shown in the table of FIG. 7, when the operational clock signal A is in a low signal state, then the transparent latch 84 is in a transparent state and so the output Q of the latch 84 has the same signal state as the enable signal. At this point, changes in the enable signal will be propagated through to the logic gate 82. In contrast, when the operational clock signal A is in a high signal state, then the transparent latch 84 is non-transmitting, and so the latch output Q retains its current state, irrespective of changes in the enable signal.

The logic gate 82, which in this example is an AND gate, combines the enable signal selectively output from the transparent latch 84 with the operational clock signal A received from the pulse generator 80 using an AND operation, and outputs the result of the logical operation as a gated operational clock at the operational clock frequency. While the logic gate 82 is an AND gate in FIG. 6, the logic gate may also be another kind of logic gate, for example a NAND gate.

FIG. 7 shows the relationship between the enable signal, the operational clock signal A output by the pulse generator 80, the latch output Q of the transparent latch 84, and the gated operational clock signal output by the clock gating circuit 64. When the operational clock signal output by the pulse generator 80 has a low signal value, then irrespective of the value of the enable signal, the gated operational clock signal output by the logic gate 82 will have a low signal value. Nevertheless, as the latch 84 is transparent while the operational clock signal A is low, then changes in the enable signal will be propagated through to the logic gate 82.

In contrast, when the operational clock signal A is high, then the latch 84 becomes non-transmitting, and so the latch 84 will prevent changes in the enable signal from propagating to the logic gate 82. The latch output Q will be held at its previous value. If the previous value Q[n] of the latch output was high, then the gated operational clock will also be high, while if the previous value Q[n] of the latch output Q was low, then the gated operational clock will also be low. Any changes in the state of the enable signal while the operational clock signal A is high will not be propagated to the logic gate 82 until the operational clock signal A switches back to a low signal state.

FIG. 8 shows an example of the signal timings of the various signals within the clock gate 64 shown in FIG. 6. The distribution (slow) clock signal is input to the clock gate 64 at a given distribution clock frequency. The pulse generator 80 generates an operational clock signal A having a higher frequency than the distribution clock signal. While the enable signal remains high, signal transitions of the operational clock signal "A" trigger corresponding signal transitions in the gated operational clock signal, and so clock transitions are able to propagate to circuitry located downstream of the clock gate 64. In contrast, when the enable signal is low then signal transitions of the operational clock signal A are blocked from being transmitted to the downstream circuitry.

FIG. 8 shows how the transparent latch 84 enables the gated operational clock signal to be protected against glitches in the enable signal. If a glitch in the enable signal triggers a spike in the gated operational clock signal, then this could cause errors in circuitry downstream from the clock gate 64, since a spike in the gated operational clock signal could erroneously trigger processing in the downstream circuitry. The transparent latch 84 helps to reduce the susceptibility of the integrated circuit 80 to such glitches. If a glitch 88 occurs while the operational clock signal A is in a low signal state, then the glitch 88 will not trigger a spike in the gated operational clock signal output by the clock gate 64. Even though the change in state of the enable signal will be propagated to the logic gate 82, the output of the AND gate 82 will remain low because the operational clock signal A is in a low signal state. Also, if another glitch 90 occurs while the operational clock signal A is in a high signal state, then this change will not be propagated through to the AND gate 82 because the latch 84 is non-transmitting while the clock signal A is high. Hence, the latch output Q will remain in its previous (low) state and so the gated operational clock signal will remain low. Hence, the transparent latch 84 helps to reduce the likelihood that glitches in the enable signal result in spikes in the gated operational clock signal.

Figure 9:
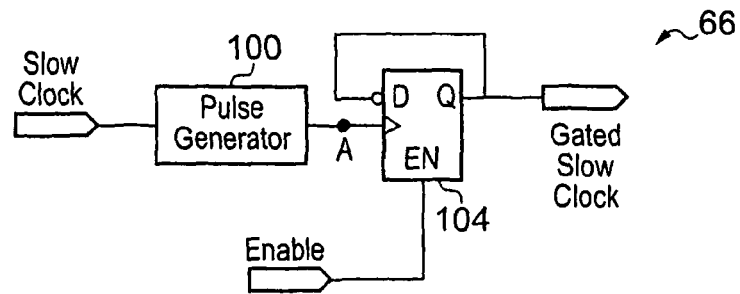
FIG. 9 schematically illustrates an example of an intermediate clock gate for use at an intermediate point of the clock distribution circuitry.

FIG. 9 shows an example of an intermediate clock gating circuit 66 suitable for use higher up in the clock distribution tree (e.g. as in the clock gates 66 shown in FIG. 5). The intermediate clock gating circuit 66 may be used for controlling clock gating at a less finely grained level than the clock gating circuit 64. The intermediate clock gating 66 receives a distribution clock signal (Slow Clock) from an upstream clock distribution portion of the distribution circuitry, gates the distribution clock signal in dependence on an enable signal (Enable), and outputs a gated distribution clock signal (Gated Slow Clock) to a downstream portion of the distribution circuitry. Both the input and output clock signals of the intermediate clock gate 66 are at the distribution clock frequency. Hence, one would expect that no clock conversion capability would be required within the intermediate clock gate 66.

However, the enable signal, which controls whether the clock gate 66 enables clock transitions in the distribution clock signal to be propagated to downstream circuitry as clock transitions of the gated distribution clock signal, may switch states at the operational clock frequency. This is because the enable signal may be produced by an element of the integrated circuit 50 which is itself clocked at the operational clock frequency. For example, the enable for the clock gate 66 may be received from one of the registers of register banks 58, 60. As the enable signal may transition at the operational clock frequency, then it may be desirable to perform the gating function of the intermediate clock gate 66 at the operational clock frequency.

To enable the clock gating to be performed at the operational clock frequency, the intermediate clock gate 66 is provided with a clock converter (eg a pulse generator) 100 for converting the distribution clock signal received from the upstream portion of the distribution network into an intermediate operational clock signal A having the operational clock frequency. The intermediate clock gate 66 controls, in response to the enable signal, whether or not signal transitions in the intermediate operational clock signal A are allowed to propagate beyond the intermediate clock gate 66. The intermediate clock gate 66 also converts the gated clock signal into a gated distribution clock signal having the distribution clock frequency.

In some embodiments, separate circuits may be provided for gating the intermediate operational clock signal, and converting the gated intermediate operational clock signal back into a distribution clock signal having the distribution clock frequency.

However, in the example FIG. 9 a toggle flip-flop 104 is provided to perform both the gating function and the clock conversion function. The toggle flip-flop 104 receives the enable signal at an enable input EN, and is clocked by the intermediate operational clock signal A generated by the clock converter 100. The output Q of the toggle flip-flop 104 is inverted and fed back into the toggle flip-flop 104 as an input D. When the enable signal has a first state (for example a high signal level), then the output of the toggle flip-flop 104 is toggled in response to each cycle of the intermediate operational clock signal A. On the other hand, when the enable signal has a second level (for example a low signal level), then the output of the toggle flip-flop 104 is maintained as its current level.

Figure 10:
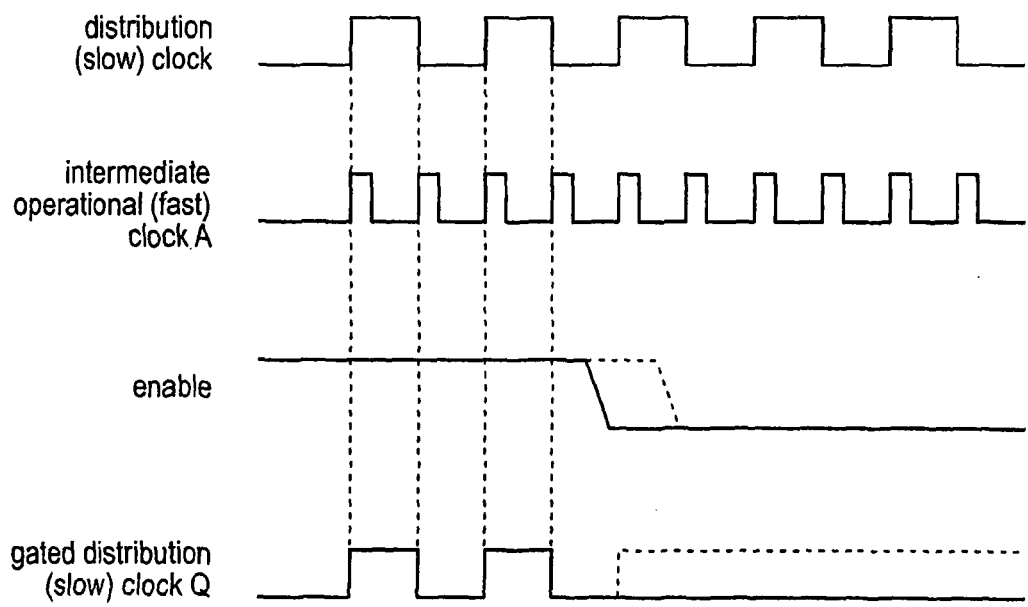
FIG. 10 illustrates example signal timings for the intermediate clock gate of FIG. 9.

FIG. 10 illustrates an example of signal timings within the intermediate clock gate 66 shown in FIG. 9. The intermediate clock gate 66 receives, from an upstream distribution portion of the distribution tree, a distribution clock signal having the distribution clock frequency. The clock converter 100 converts the distribution clock signal into an intermediate operational clock signal A. When the enable signal is in the high state, then the toggle flip-flop 104 switches the value of the gated distribution clock signal Q in response to each clock cycle of the intermediate operational clock signal A. For example, the gated distribution clock signal Q is switched in response to each rising edge of the intermediate operational clock signal A.

When the enable signal is switched to a low state, then the toggle flip-flop 104 maintains the gated distribution clock signal Q in its current state irrespective of the transitioning of the intermediate operational clock signal A. FIG. 10 shows that the gated distribution clock signal can be maintained in the high signal state or the low signal state as desired, by selecting the timing at which the enable signal is switched from the high value from low value. In the example shown by the solid line in FIG. 10, the enable signal is switched from a high level to a low level at a time when the gated distribution clock signal is low, and so the gated distribution clock signal then remains in the low signal level. Alternatively, in the example shown by the dotted line in FIG. 10, the enable signal is maintained at a high signal level for one more cycle of the intermediate operational clock signal A before being switched to the low signal level at a time when the gated distribution clock signal is high, and so this time the gated distribution clock signal remains in the high logic state following the transition of the enable signal to a low signal level.

As shown in FIG. 10, the toggle flip-flop 104 generates a gated distribution clock signal Q having half the frequency of the intermediate operational clock signal A. Hence, the toggle flip-flop 104 provides both the clock gating function for controlling whether clock transitions are propagated to downstream circuits, and the clock conversion function of converting the intermediate clock signal A having the operational clock frequency into the gated distribution clock signal having the (lower) distribution clock frequency.

Standard cell libraries may be modified to include cell definition data defining clock gate configurations, for example as shown in FIGS. 6 and 9. Such standard cell libraries provide data for controlling the generation and validation of circuit layouts. Previously known standard cell libraries have included designs for clock gates which do not have the clock conversion function described above. By modifying the standard cell definition of the clock gates so that the clock gates also include the clock conversion capability (e.g. including a circuit cell definition of a pulse generator as shown in FIG. 6 or 9), then the clock conversion technique can be applied to the integrated circuit with little modification of the rest of the integrated circuit. This helps to reduce the amount of circuit redesign required for implementing the power saving technique.

It is not necessary for all functional circuits to be compatible with the present technique. As shown in FIG. 3, some types of clock converter 10 may result in an operational clock signal which has a relatively short pulse width p and a duty ratio other than 50%. This may not be appropriate in some functional circuits For example, some circuits that are triggered based on both rising and falling edges of the clock signal may require a clock signal having a duty ratio that is closer to 50%.

Even if one or more functional circuits are not compatible with the clock conversion technique described above, the clock conversion technique may still be used for any functional circuits which are compatible with the operational clock signal produced using the clock converters, in order to reduce the power consumed in distributing a clock signal to those functional circuits. Any further functional circuits which cannot use such a operational clock signal can be provided with a separate clock distribution network for distributing a further operation clock signal.

Figure 11:
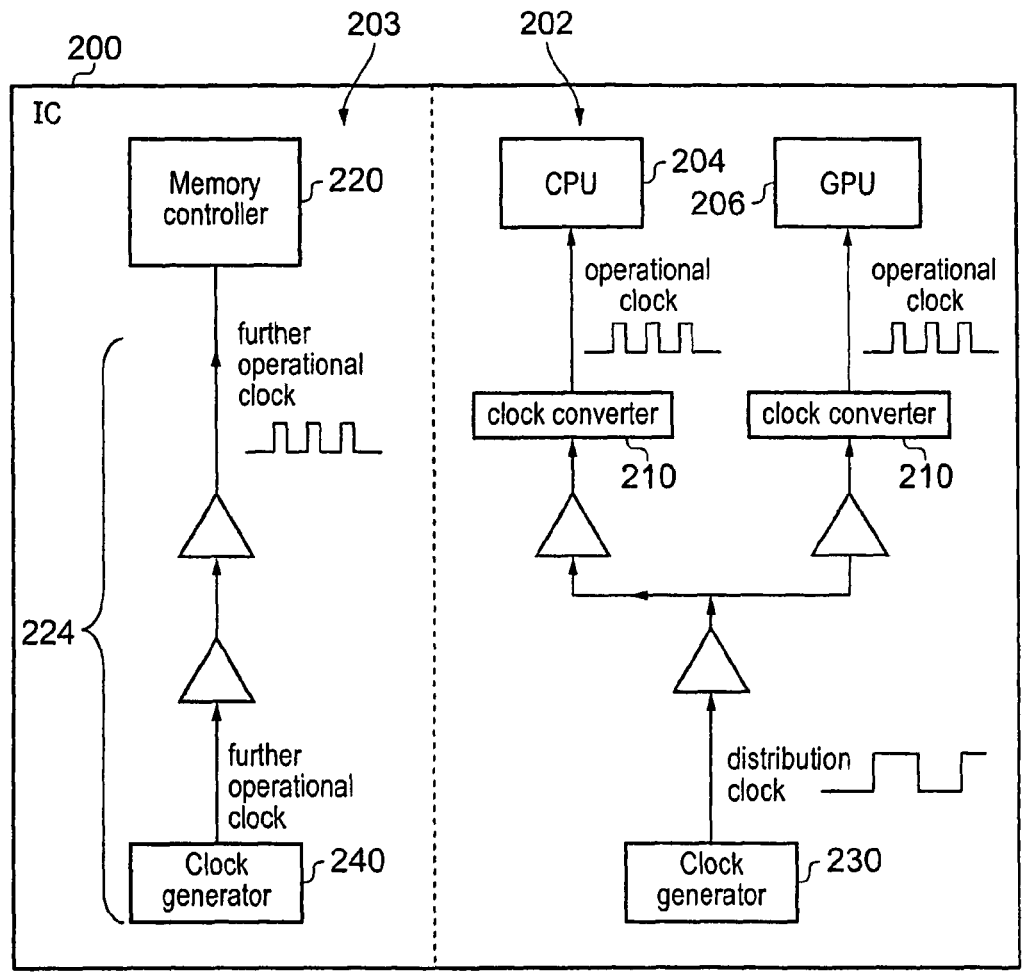
FIG. 11 illustrates an integrated circuit including a functional circuit provided with an operational clock signal generated from a distribution clock signal which is distributed at a distribution clock frequency, and a further functional circuit which is provided with a further operational clock signal which is distributed at a further operational clock frequency.

FIG. 11 shows an integrated circuit 200 which is effectively divided into two portions 202, 203. The first portion 202 of the integrated circuit 200 is similar to the examples shown above, and comprises functional circuits 204, 206 which are clocked by an operational clock signal generated by clock converters 210 from a distribution clock signal distributed at a lower frequency. In contrast, the portion 203 includes a further functional circuit 220 (in this example, a memory controller) which is incompatible with the operational clock signal produced by the clock converters 210. Hence, a further clock distribution network 224 is provided to supply a further operational clock signal to the functional circuit 220. The further operational clock signal may have, for example, a more even duty ratio than the operational clock signal used in the other portion 202 of the integrated circuit 200. The further operational clock signal may have a clock frequency that is the same as the operational clock frequency, or may have a different frequency.

Hence, by applying the clock conversion technique described above to those functional circuits 204, 206 which can support such clock conversion, the power consumed can be reduced. A functional circuit 220 that cannot support such clock conversion can continue to operate in response to the operational clock signal for which they are designed.

In the example of FIG. 11, the distribution clock signal is not generated off-chip as shown in FIG. 1. Instead, an on-chip clock generator 230 may be provided for generating the distribution clock signal. In a similar way, in any of the above examples, an on-chip clock generator 230 may be used instead of the clock input. Similarly, for a portion 203 of the integrated circuit 200 that does not use the clock conversion technique, the further operational clock signal may be generated by an on-chip clock generator 240 or may alternatively be generated by an external clock generator.

Figure 12:
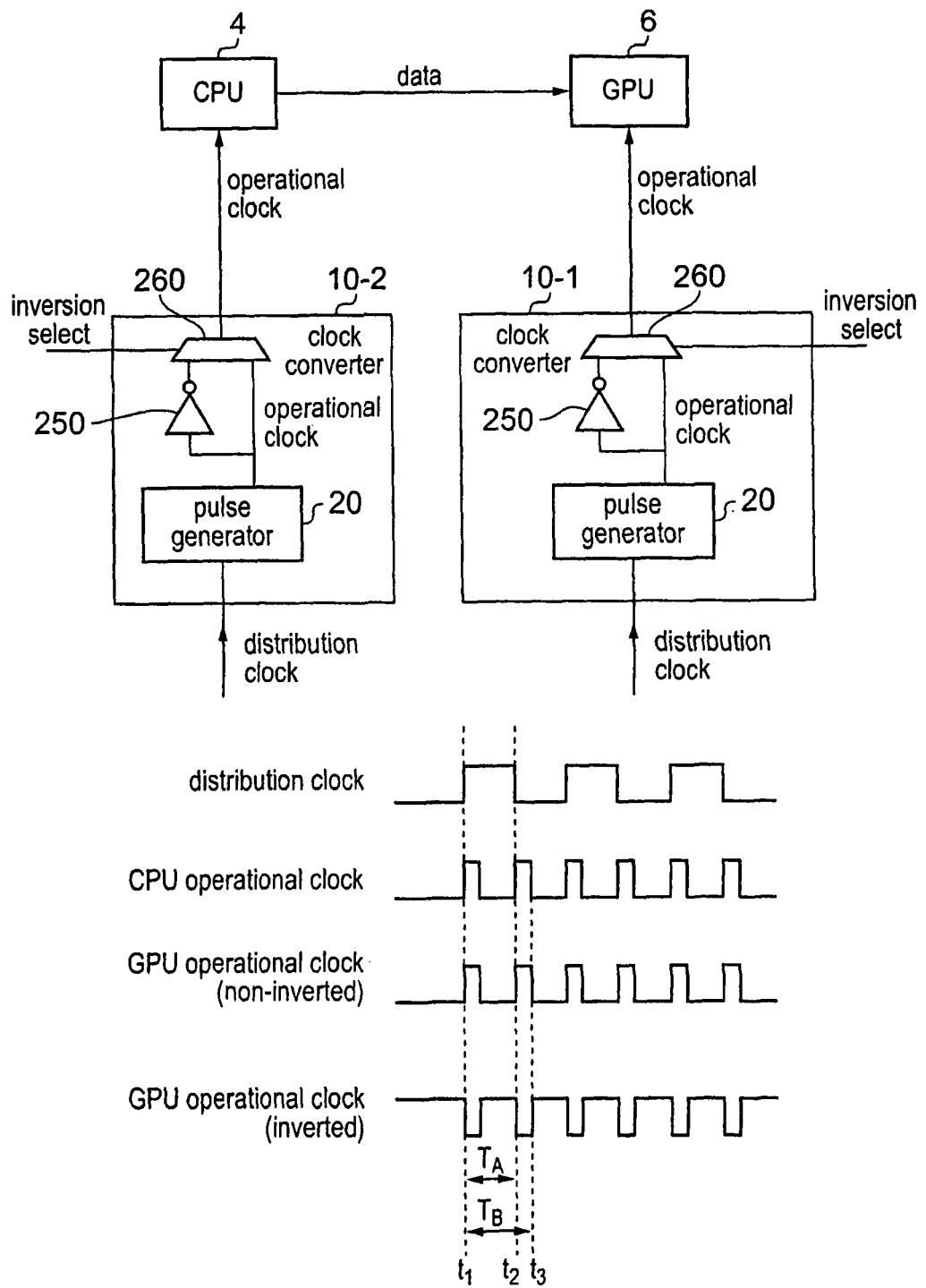
FIG. 12 illustrates the use of selective inversion within the clock converter to adjust the relative timings of rising and falling edges within the operational clock signal.

FIG. 12 shows a variant of the clock converter 10. The clock converter 10 may invert the generated operational clock signal prior to supplying the operational clock signal to an associated functional circuit. For example, as shown in FIG. 12, the output of the pulse generator 20 may be supplied to an inverter 250 for inverting the clock signal before supplying the clock signal to the functional circuit. While some kinds of clock converter 10 may be arranged to always invert the clock signal, it can be useful to provide selective inversion capability. For example, a multiplexer 260 may be provided to select between an inverted version of the operational clock signal and a non-inverted version of the operational clock signal in dependence on an inversion selection control signal.

The timing diagram at the bottom of FIG. 12 shows why it may be useful to provide such selected inversion capability. When a clock signal is inverted, then the rising edges of the clock signal become falling edges and vice versa (see the relationship between the non-inverted and inverted versions of the GPU operational clock shown in FIG. 12), and so the timings at which rising and falling edges occur can be adjusted. If an associated functional circuit is triggered only by rising edges, for example, then selectively inverting the clock signal changes the timings at which that functional circuit is triggered by the clock signal. This can be useful when there are two functional circuits, or two different parts of the same functional circuit, that are triggered by different clock signals produced by different clock converters 10.

For example, in FIG. 12 a graphics processing unit (GPU) 6 is clocked by an operational clock signal generated by a first clock converter 10-1 and a processing unit (CPU) 4 is clocked by an operational clock signal generated by a second clock converter 10-2. The signal diagram at the bottom of FIG. 12 shows an example where the multiplexer 260 of the second clock converter 10-2 associated with the CPU is set so that the CPU clock signal is not inverted, while the multiplexer 260 of the first clock converter 10-1 associated with the GPU 6 is set to selectively invert or not invert the GPU clock signal.

When neither of the clock converters 10-1, 10-2 applies an inversion then the operational clock signals output to the CPU 4 and the GPU 6 are the same. Hence, the CPU 4 and GPU 6 are triggered at the same time. As shown in FIG. 12, the rising edges of the CPU operational clock and non-inverted GPU operational clock occur at the same times $t_1$, $t_2$.

In contrast, if the GPU clock is inverted relative to the CPU clock, then the rising edges of the respective clocks occur at different times. For example, whereas a rising edge of the CPU operational clock occurs at time $t_2$, the corresponding rising edge of the inverted GPU clock does not occur until time $t_3$. This can be useful, because the delay between an event controlled by the CPU operational clock and an event controlled by the GPU operational clock can therefore be adjusted based on whether an inversion is applied or not.

For example, consider the situation shown in FIG. 12 where the GPU 6 captures a data value generated by the CPU 4. The CPU 4 begins generating the data value in response to the rising edge of one processing cycle of the CPU clock (e.g. at time $t_1$), and the GPU 6 captures that data value in response to the rising edge of the following processing cycle of the GPU clock. If neither clock signal is inverted, then the rising edge of the following cycle of the non-inverted GPU clock occurs at time $t_2$, and so the period of time available for the CPU 4 to generate the data value before it is captured by the GPU 6 is $T_A$ ($t_2-t_1$).

In contrast, if the GPU operational clock signal is inverted, then the rising edge of the following cycle of the inverted GPU operational clock signal does not occur until time $t_3$. Hence, there is now an increased period $T_B$ ($t_3-t_1$) available for the CPU 4 to generate the data value before the value is captured by the GPU 6. Hence, the inversion of the GPU clock signal can be used to reduce the likelihood of errors occurring as a result of the GPU 6 capturing the data value before the CPU 4 has finished generating the data value.

In a similar way, inversion of a clock signal by the clock converter 10 relative to clock signals supplied to other parts of the integrated circuit can be used to statically compensate for process variations which differ between different parts of the integrated circuit. Moreover, selective inversion can be used to provide dynamic compensation for countering temperature and voltage dependent effects. Hence, including an inverter within the clock converter can be used to increase yield, reliability and performance.

Figure 13A:
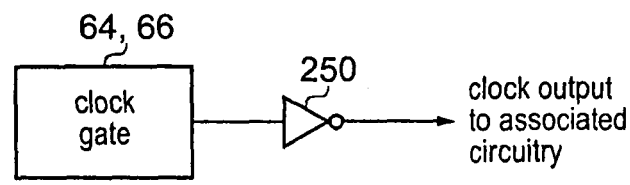
FIG. 13A illustrates an example of a clock gate having an inverter for inverting the clock signal.
Figure 13B:
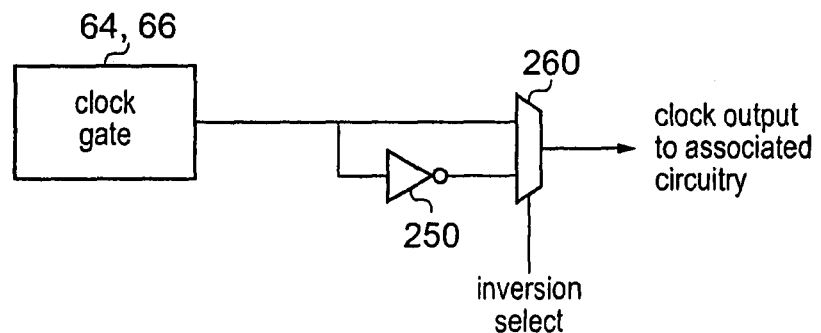
FIG. 13B shows an example of a clock gate having an inverter for selectively inverting the operational clock signal.

In a similar way, inverters can be included as part of the clock gates described above to provide inversion capability. FIGS. 13A and 13B show examples in which the clock gates 64, 66 described above may be provided with an inverter 250 for inverting the output of the clock gate. The clock gates may be provided either with a permanent inversion function as shown in FIG. 13A or with a selective inversion function as shown in FIG. 13B.

In summary, a clock signal can be distributed across an integrated circuit at a lower frequency than the operational frequency with which functional circuits are designed to operate. After being distributed at the lower frequency, the distribution clock signal can be converted into a suitable operational clock signal having the operational frequency, and used to control the operation of the function circuits. Since the clock signal is distributed a lower frequency, the integrated circuit consumes less energy.

As well as converting the frequency of the clock signal, the clock converter 10 may also include a voltage converter for converting the signal voltage of the clock signal. In this case, further power savings can be achieved by distributing the clock signal at a distribution voltage level lower than the operational voltage level required by the functional circuit, and converting the clock signal to the operational voltage level for supply to the functional circuit.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. An integrated circuit comprising:
    a functional circuit configured to operate in response to an operational clock signal having an operational clock frequency;
    clock distribution circuitry configured to distribute a distribution clock signal across said integrated circuit at a distribution clock frequency, said distribution clock frequency being less than said operational clock frequency; and
    a clock converter configured to convert said distribution clock signal distributed by said clock distribution circuitry into said operational clock signal for controlling operation of said functional circuit;
    wherein said clock distribution circuitry comprises:
        an upstream distribution portion for distributing said distribution clock signal across said integrated circuit at said distribution clock frequency;
        an intermediate clock gating circuit for receiving said distribution clock signal from said upstream distribution portion; and
        a downstream distribution portion for distributing said distribution clock signal from said intermediate clock gating circuit to at least said clock converter at said distribution clock frequency;
    said intermediate clock gating circuit is configured to control whether or not a clock transition of said distribution clock signal is propagated to said downstream distribution portion;
    said intermediate clock gating circuit comprises an intermediate clock converter configured to convert said distribution clock signal received from said upstream distribution portion into an intermediate operational clock signal having said operational clock frequency; and
    said intermediate clock gating circuit is configured to generate, in response to said intermediate operational clock signal and an enable signal, a gated distribution clock signal, and to output said gated distribution clock signal to said downstream distribution portion at said distribution clock frequency.

2. An integrated circuit according to claim 1, wherein said clock distribution circuitry comprises a clock input for receiving said distribution clock signal from an external clock generator.

3. An integrated circuit according to claim 1, wherein said clock distribution circuitry comprises a clock generator for generating said distribution clock signal.

4. An integrated circuit according claim 1, wherein said distribution clock frequency is substantially half said operational clock frequency.

5. An integrated circuit according to claim 1, wherein said clock converter comprises a pulse generator configured to generate a clock pulse in response to each clock transition of said distribution clock signal, said operational clock signal comprising a series of clock pulses generated by said pulse generator.

6. An integrated circuit according to claim 1, comprising a clock gating circuit for controlling whether a clock transition of said operational clock signal is propagated to said functional circuit.

7. An integrated circuit according to claim 6, wherein said clock gating circuit comprises said clock converter for converting said distribution clock signal into said operational clock signal.

8. An integrated circuit according to claim 7, wherein said clock gating circuit is configured to receive said distribution clock signal from said clock distribution circuitry, to convert said distribution clock signal into said operational clock signal using said clock converter, and to output to said functional circuit a gated operational clock signal generated in response to said operational clock signal and an enable signal; and
    said clock gating circuit controls, in dependence on said enable signal, whether a clock transition of said operational clock signal triggers a clock transition of said gated operational clock signal.

9. An integrated circuit according to claim 8, wherein said clock gating circuit comprises a logic gate configured to generate said gated operational clock signal by applying a logical operation to said operational clock signal and said enable signal.

10. An integrated circuit according to claim 9, wherein said clock gating circuit comprises a transparent latch configured to selectively supply said enable signal to said logic gate in dependence on a current state of said operational clock signal.

11. An integrated circuit according to claim 1, wherein said intermediate clock gating circuit comprises a toggle flip-flop configured to generate said gated distribution clock signal, said toggle flip-flop being configured such that:
    when said enable signal has a first state, then said toggle flip-flop toggles the value of said gated distribution clock signal in response to each clock cycle of said intermediate operational clock signal; and
    when said enable signal has a second state, then said toggle flip-flop holds said gated distribution clock signal at its current value.

12. An integrated circuit according to claim 1, comprising a plurality of functional circuits configured to operate in response to said operational clock signal having said operational clock frequency; and
 at least one clock converter configured to convert said distribution clock signal distributed by said clock distribution circuitry into said operational clock signal for controlling operation of at least one associated functional circuit.

13. An integrated circuit according to any claim 1, comprising:
 further clock distribution circuitry configured to distribute a further operational clock signal across said integrated circuit at a further operational clock frequency; and
 at least one further functional circuit configured to operate in response to said further operational clock signal distributed by said further clock distribution circuitry.

14. An integrated circuit according to claim 1, wherein said clock converter comprises an inverter for inverting said operational clock signal for supply to said functional circuit.

15. An integrated circuit according to claim 14, wherein said clock converter is configured to selectively invert said operational clock signal in dependence on an inversion control signal.

16. An integrated circuit according to claim 14, comprising a second clock converter configured to convert said distribution clock signal distributed by said clock distribution circuitry into said operational clock signal for controlling operation of an associated functional circuit; wherein:
 when said clock converter inverts said operational clock signal for supply to said functional circuit, then said second clock converter supplies a non-inverted operational clock signal to said associated functional circuit.

17. An integrated circuit comprising:
 functional circuit means for operating in response to an operational clock signal having an operational clock frequency;
 clock distribution means for distributing a distribution clock signal across said integrated circuit at a distribution clock frequency, said distribution clock frequency being less than said operational clock frequency; and
 clock converting means for converting said distribution clock signal distributed by said clock distribution means into said operational clock signal for controlling operation of said functional circuit means;
 wherein said clock distribution means comprises:
 upstream distribution means for distributing said distribution clock signal across said integrated circuit at said distribution clock frequency;
 an intermediate clock gating means for receiving said distribution clock signal from said upstream distribution means; and
 downstream distribution means for distributing said distribution clock signal from said intermediate clock gating means to at least said clock converting means at said distribution clock frequency;
 said intermediate clock gating means is configured to control whether or not a clock transition of said distribution clock signal is propagated to said downstream distribution means;
 said intermediate clock gating means comprises an intermediate clock converting means for converting said distribution clock signal received from said upstream distribution means into an intermediate operational clock signal having said operational clock frequency; and
 said intermediate clock gating means is configured to generate, in response to said intermediate operational clock signal and an enable signal, a gated distribution clock signal, and to output said gated distribution clock signal to said downstream distribution means at said distribution clock frequency.

18. A method of operating an integrated circuit comprising a functional circuit for operating in response to an operational clock signal having an operational clock frequency, said method comprising:
 distributing a distribution clock signal across said integrated circuit, said distribution clock signal having a distribution clock frequency, said distribution clock frequency being less than said operational clock frequency;
 converting said distribution clock signal into said operational clock signal having said operational clock frequency; and
operating said functional circuit in response to said operational clock signal having said operational clock frequency;
 wherein said distributing comprises:
 distributing said distribution clock signal across said integrated circuit at said distribution clock frequency via an upstream distribution portion;
 receiving said distribution clock signal from said upstream distribution portion at an intermediate clock gating circuit;
 said intermediate clock gating circuit converting said distribution clock signal received from said upstream distribution portion into an intermediate operational clock signal having said operational clock frequency;
 said intermediate clock gating circuit generating, in response to said intermediate operational clock signal and an enable signal, a gated distribution clock signal; and
 said intermediate clock gating circuit outputting said gated distribution clock signal to said downstream distribution portion at said distribution clock frequency.

19. A clock gating circuit for controlling the supply of an output clock signal to associated circuitry, said clock gating circuit comprising:
 a clock input configured to receive a distribution clock signal having a distribution clock frequency;
 a clock converter configured to convert said distribution clock signal into an operational clock signal having an operational clock frequency, said operational clock frequency being higher than said distribution clock frequency;
 gating circuitry configured to generate said output clock signal based on an enable signal and said operational clock signal generated by said clock converter; and
a clock terminal configured to output said output clock signal to said associated circuitry at said distribution clock frequency;
wherein said gating circuitry is configured to control, in dependence on said enable signal, whether a clock transition of said operational clock signal triggers a clock transition in said output clock signal, and
wherein said gating circuitry comprises a toggle flip-flop configured to generate said output clock signal in response to said operational clock signal and said enable signal, wherein said toggle flip-flop is configured such that:
when said enable signal has a first state, then said toggle flip-flop toggles the value of said output clock signal in response to each clock cycle of said operational clock signal; and
when said enable signal has a second state, then said toggle flip-flop holds said output clock signal at its current value.

20. A clock gating circuit according to claim 19, wherein said distribution clock frequency is half said operational clock frequency.

21. A clock gating circuit according to claim 19, wherein said clock converter comprises a pulse generator configured to generate a clock pulse in response to each clock transition of said distribution clock signal, said operational clock signal comprising a series of clock pulses generated by said pulse generator.

22. A clock gating circuit according to claim 19, wherein said gating circuitry comprises a logic gate configured to generate said output clock signal by applying a logical operation to said operational clock signal and said enable signal.

23. A clock gating circuit according to claim 22, wherein said gating circuitry comprises a transparent latch configured to selectively supply said enable signal to said logic gate in dependence on a current state of said operational clock signal.

24. A non-transitory computer-readable storage medium storing a data structure comprising a standard cell circuit definition for controlling a computer to generate and validate a circuit layout of a circuit cell of an integrated circuit, said circuit cell comprising the clock gating circuit according to claims 19.

25. A clock gating circuit for controlling the supply of an output clock signal to associated circuitry, said clock gating circuit comprising:
    a clock input configured to receive a distribution clock signal having a distribution clock frequency;
    a clock converter configured to convert said distribution clock signal into an operational clock signal having an operational clock frequency, said operational clock frequency being higher than said distribution clock frequency;
    gating circuitry configured to generate said output clock signal based on an enable signal and said operational clock signal generated by said clock converter; and
    a clock terminal configured to output said output clock signal to said associated circuitry at said distribution clock frequency;
        wherein said gating circuitry is configured to control, in dependence on said enable signal, whether a clock transition of said operational clock signal triggers a clock transition in said output clock signal,
    the clock gating circuit further comprising an inverter for inverting said output clock signal generated by said gating circuitry and supplying said inverted output clock signal to said clock terminal, and
    wherein said clock gating circuit is configured to selectively invert said output clock signal in dependence on an inversion control signal.

26. A clock gating circuit for controlling the supply of an output clock signal to associated circuitry, said clock gating circuit comprising:
    clock input means for receiving a distribution clock signal having a distribution clock frequency;
    clock converting means for converting said distribution clock signal into an operational clock signal having an operational clock frequency, said operational clock frequency being higher than said distribution clock frequency;
    gating means for generating said output clock signal based on said operational clock signal generated by said clock converting means and an enable signal; and
    clock output means for outputting said output clock signal to said associated circuitry at said distribution clock frequency; wherein
    said gating means is configured to control, in dependence on said enable signal, whether a clock transition of said operational clock signal triggers a clock transition in said output clock signal.

27. A method for controlling the supply of an output clock signal to associated circuitry, said method comprising steps of:
    receiving a distribution clock signal having a distribution clock frequency;
    converting said distribution clock signal into an operational clock signal having an operational clock frequency, said operational clock frequency being higher than said distribution clock frequency;
    generating said output clock signal based on said operational clock signal and an enable signal; and
    outputting said output clock signal to said associated circuitry at said distribution clock frequency;
    wherein said generating step includes controlling, in dependence on said enable signal, whether a clock transition of said operational clock signal triggers a clock transition in said output clock signal, and
    wherein when said enable signal has a first state, the generating step includes toggling the value of said output clock signal in response to each clock cycle of said operational clock signal, and when said enable signal has a second state, the generating step includes holding said output clock signal at its current value.

* * * * *